United States Patent
Nakamura

(10) Patent No.: US 6,892,943 B2
(45) Date of Patent: May 17, 2005

(54) FOOD PRODUCT TRACING SYSTEM, PROGRAM AND METHOD THEREOF

(75) Inventor: Kazuo Nakamura, Saitama-ken (JP)

(73) Assignee: PENTAX Corporation, Tokyo (JP)

(*) Notice: Subject to any disclaimer, the term of this patent is extended or adjusted under 35 U.S.C. 154(b) by 102 days.

(21) Appl. No.: 10/602,633

(22) Filed: Jun. 25, 2003

(65) Prior Publication Data

US 2004/0089716 A1 May 13, 2004

(30) Foreign Application Priority Data

Jun. 26, 2002 (JP) ........................................ 2002-186430

(51) Int. Cl.[7] .............................................. G06F 17/60
(52) U.S. Cl. ...................... 235/385; 235/383; 235/487; 426/231; 340/573.3; 340/572.4
(58) Field of Search ................................. 235/385, 383, 235/487; 426/231; 340/573.3, 572.4

(56) References Cited

U.S. PATENT DOCUMENTS

| | | | |
|---|---|---|---|
| 5,478,990 A | 12/1995 | Montanari et al. | 235/375 |
| 6,104,966 A * | 8/2000 | Haagensen | 700/116 |
| 6,231,435 B1 * | 5/2001 | Pilger | 452/157 |
| 6,346,885 B1 * | 2/2002 | Curkendall | 340/572.4 |
| 2001/0029996 A1 * | 10/2001 | Robinson | 141/11 |
| 2002/0004366 A1 | 1/2002 | Thorvaldsson et al. | 452/198 |
| 2002/0015876 A1 * | 2/2002 | Pape et al. | 141/11 |
| 2003/0000628 A1 * | 1/2003 | Thomas et al. | 235/385 |

FOREIGN PATENT DOCUMENTS

| | | |
|---|---|---|
| GB | 2372346 | 8/2002 |
| JP | 2001-56706 | 2/2001 |
| JP | 2001-56707 | 2/2001 |
| WO | 01/91565 | 12/2001 |

\* cited by examiner

*Primary Examiner*—Jared J. Fureman
*Assistant Examiner*—Allyson N. Trail
(74) *Attorney, Agent, or Firm*—Greenblum & Bernstein, P.L.C.

(57) ABSTRACT

The system includes a storage including records created for every product at every stage and a processor operated by first and second processes. Each record includes a first stage information at which the food product is processed, a first time information for specifying the time period of processing at the first stage, a second stage information at which the livestock product processed at the first stage is received as material and a second time information for specifying the time period of processing at the second stage. The first process specifies a target record whose first stage and time information are coincident with that of an original product. The second process specifies a new target record whose first stage and time information are coincident with the second stage and time information of the previous target record. The second process is repeated until a new target record cannot be specified.

12 Claims, 10 Drawing Sheets

| Record number | Product stage name Material stage name | Production start time Service start time | Production stop time Service stop time | ID number Distribution finish information |
|---|---|---|---|---|
| 1 | A<br>B | T11<br>T21 | T12<br>T22 | SS1 |
| 2 | B<br>C | T31<br>T41 | T32<br>T42 | SS2 |
| 3 | B<br>D | T51<br>T61 | T52<br>T62 | SS3 |
| 4 | B<br>E | T71<br>T81 | T72<br>T82 | SS4<br>Finish |
| 5 | C<br>F | T91<br>T101 | T92<br>T102 | SS5 |
| 6 | D<br>G | T111 | T112 | SS6 |
| N | Km<br>Kn | Tm1<br>Tn1 | Tm2<br>Tn2 | SSz |

FOOD PRODUCT TRACING SYSTEM, PROGRAM AND METHOD THEREOF

BACKGROUND OF THE INVENTION

The present invention relates to a food product tracing system that traces a food product such as a livestock product distributed from a producer such as a stockbreeder to an end supplier (a retailer, a processing supplier, a processing supplier), a food product tracing program to make a computer function as such a food product tracing system and a food product tracing method realized by such a system.

A domestic animal (a cow, a pig, a sheep, a cock, etc) bred by a stockbreeder is slaughtered and dismantled by a dismantling supplier and distributed by a distributor (a food company) to an end supplier (retail by a retailer, processing to a secondary product by a processing supplier). In this specification, a livestock product means not only a secondary product such as meat but also a domestic animal itself at an initial stage of the distribution.

In the distribution of a livestock product, it is important to keep safety of a product. However, a livestock product coming from a diseased livestock may be distributed on a distribution channel. Typical examples are prion disease of a domestic animal, which are mad cow disease (BSE, bovine spongiform encephalopathy) in a cow and scrapie disease in a sheep, and foot-and-mouth disease. While an infection route of prion disease is not completely elucidated, the strong opinion says that the prion disease infects by taking feed containing protein called abnormal prion. Further, since foot-and-mouth disease is a viral contagious disease, it infects through skin infection besides oral infection.

A livestock product infected with such a pathogen is not completely safe even if any treatment is applied. In particular, a livestock product coming from a domestic animal infected with prion disease should be taken out from a distribution channel to incinerate promptly because abnormal prion is hard to disintegrate by an usual heat treatment and mutual infection between Creutzfeldt-Jacob disease that infects with human and BSE is indicated.

In order to keep safety of a livestock product, a method to control distribution of livestock products by applying an ID number to every domestic animal is previously used. According to this method, the same ID number is applied to the livestock products coming from an individual of a certain domestic animal. Therefore, when a result of an infection test immediately after slaughter is officially announced, a supplier of each stage in a distribution channel of livestock products is able to know whether the products under his/her control are produced from the infected domestic animal or not.

However, since an inspector cannot trace the livestock products coming from the infected domestic animal by himself/herself according to the conventional control method, the inspector has to inform the ID number to suppliers in the distribution channel to urge them to report whether they have livestock products coming from the infected domestic animal or not. As described above, since the effectiveness of the conventional control method is highly dependent on conscience of each supplier, it was insufficient from the viewpoint of food safety security for consumers.

SUMMARY OF THE INVENTION

It is therefore an object of the present invention is to provide an improved food product tracing system, program and method thereof, which enable that an inspector easily traces all food products coming from a certain original product at a certain stage in a distribution channel in short time.

In a food product tracing system of the present invention, food products coming from an original product is distributed along a distribution channel. The distribution channel is formed by connecting a plurality of stages at which material is processed to form a product. The system includes a storage that includes records created for every food product at every stage and a processor that operates according to programs.

Each record stored in the storage includes a first stage information for identify the first stage at which the food product is processed, a first time information for specifying the time period of processing at the first stage, a second stage information for identify the second stage at which the food product processed at the first stage is received as material and a second time information for specifying the time period of processing at the second stage.

On the other hand, the programs include a first process and a second process. The first process specifies a target record whose first stage information and first time information are coincident with the stage and the time at which the original product is processed. The second process specifies a new target record whose first stage information and first time information are coincident with the second stage information and the second time information of the previous target record. The second process is repeated until a new target record cannot be specified.

With this construction, when the second process cannot specify a new target record, the food product coming from the original product exists at the stage that is defined by the latest target record.

In this specification, the original product includes a livestock product that is formed by processing the domestic animal (a carcass of a domestic animal, a dismantled part, meat, frozen product, hides, unnecessary portions, meat-and-bone meal, a secondary product) in addition to a domestic animal itself. Therefore, livestock products can be traced in spite of a location of an original product.

Further, the information about the original product may be manually input by an operator or automatically input by the system.

Furthermore, a food product may be infected during a process at a certain stage. For example, blood of an infected livestock product splashed, a livestock product processed on the next bench may be infected. When a food product is infected from another food product coming from a different domestic animal, the newly infected product may be traced by the second process.

DESCRIPTION OF THE ACCOMPANYING DRAWINGS

DESCRIPTION OF THE EMBODIMENTS

An embodiment of the present invention will be described with reference to drawings. The embodiment discloses a livestock product control system that includes a livestock product tracing system as a food product tracing system according to the present invention and a database registration system as a precondition.

Figures 4, 5:
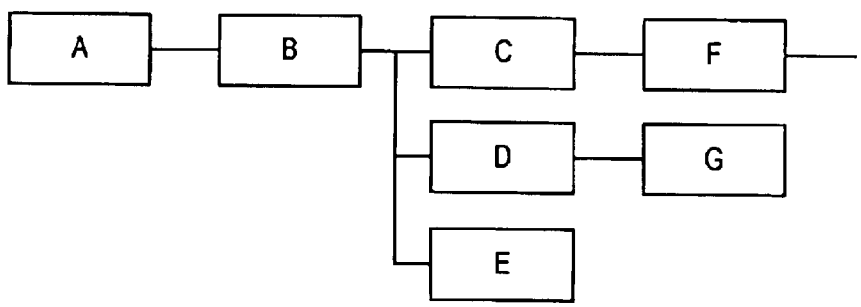
FIG. 4 is a table showing a data structure of a process control database stored in the computer center show in FIG. 1.
FIG. 5 is a block diagram showing a hierarchy structure of stages constituting a distribution channel.

In the embodiment, a hierarchy distribution channel shown in FIG. 5 is assumed. A livestock product is distributed from a stage A as a starting point along stages B through G, sequentially. Further, in the following description, a livestock product carried in each stage is called "material" and a livestock product taken out from each stage is called "product". A "product" taken out from one stage becomes "material" for the next stage. Further, focusing on one livestock product, the stage at which the livestock product is processed as "product" is called a "product stage" and the stage at which the livestock product is processed as "material" is called a "material stage".

The respective stages are distinguished by processing contents and their places, and the unique stage names A through G are assigned to the respective stages. For example, processes of different contents are defined as separate stages even if the processes are executed in the same supplier and processes at different places (a dismantling bench, an inventory location in a warehouse or the like) are defined as separate stages even if the contents of processes are identical. Therefore, an only one livestock product is processed at a certain stage at a certain time.

With this example, processing contents of the respective stages are as follows. A processing content of the stage A is breeding of a domestic animal by a stockbreeder. A processing content of the stage B is dismantling of a livestock by a dismantling supplier. A processing content of the stage C is frozen storage of meat to a meat warehouse by the dismantling supplier. A processing content of the stage D is frozen storage of unnecessary parts (a brain, a bone, internal organs or the like) to an unnecessary part warehouse by the dismantling supplier. A processing content of the stage E is safekeeping of the other parts (hides or the like) to a temporary safekeeping warehouse by the dismantling supplier. A processing content of the stage F is marketing of meat by a retailer. A processing content of the stage G is incineration of unnecessary parts by a processing supplier.

A livestock product is managed by a process control database having records shown in FIG. 4. Each record includes a "record number" field showing a registration order of the record, an "ID number" field specifying the livestock product managed with the record, a "product stage name" field showing the name of the product stage of the livestock product, a "production start time" field showing a start time of a process of the livestock product at the product stage, a "production stop time" field showing a stop time of the process of the livestock at the product stage, a "material stage name" field showing the name of the material stage of the livestock product, a "service start time" field showing a start time of use of the livestock product at the material stage, a "service stop time" field showing a stop time of use of the livestock at the material stage, and a "distribution finish information" showing whether the livestock product is taken out from distribution at the material stage or not.

In FIG. 4, the "product stage name" corresponds to a first stage information, the "production start time" and the "production stop time" (they are referred to as a production time) correspond to a first time information. Further, the "material stage name" corresponds to a second stage information, the "service start time" and the "service stop time" (they are referred to as a service time) correspond to a second time information.

An ID number recorded in each record is printed on a label as a bar code. The label is attached to a livestock product produced as a "product" at a certain stage and it is used for identification of the livestock product until the product is processed as "material" at the next stage.

Use of the database shown in FIG. 4 enables to specify the livestock product that existed in a certain time at a certain stage with the ID number given to each product and to trace the previous and/or next stages with a stage name and time information as keys.

Figure 1:
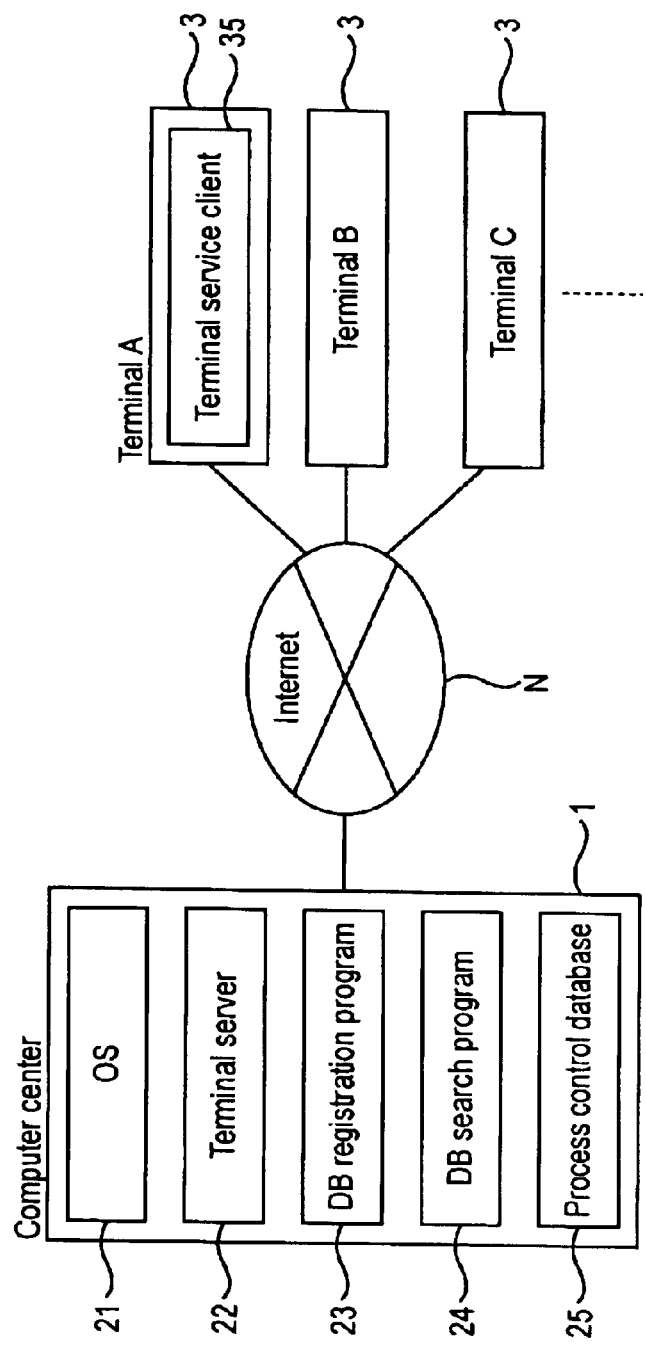
FIG. 1 is a block diagram showing a construction of a livestock product control system according to an embodiment of the present invention.

Next, the construction of the livestock product control system of the embodiment will be described. As shown in FIG. 1, the livestock product control system consists of a computer center 1, terminals 3 that are arranged corresponding to the respective stages and the Internet N. The computer center 1 and the terminals 3 are able to communicate to each other through the Internet N.

In the computer center 1, an operating system (OS) 21 that is a basic software of the computer center 1, a terminal server 22 that is a multiuser OS executed on the OS 21 to provide execution environment of terminal service for each terminal (for example, the Windows NT Server 4.0 Terminal Server Edition (trademark), the Windows 2000 Server (trademark) of Microsoft company in USA, or Meta Frame (trademark of CITRIX company in USA) that is an add-on software executed with these OS), a DB (Dara Base) registration program 23 and a DB search program 24 that are application programs executed on the terminal servers 22, and the process control database 25 (FIG. 4) are installed.

On the other hand, a service client 35 is installed in the terminal 3 to receive terminal services by the computer center 1 through the Internet N.

Figure 2:
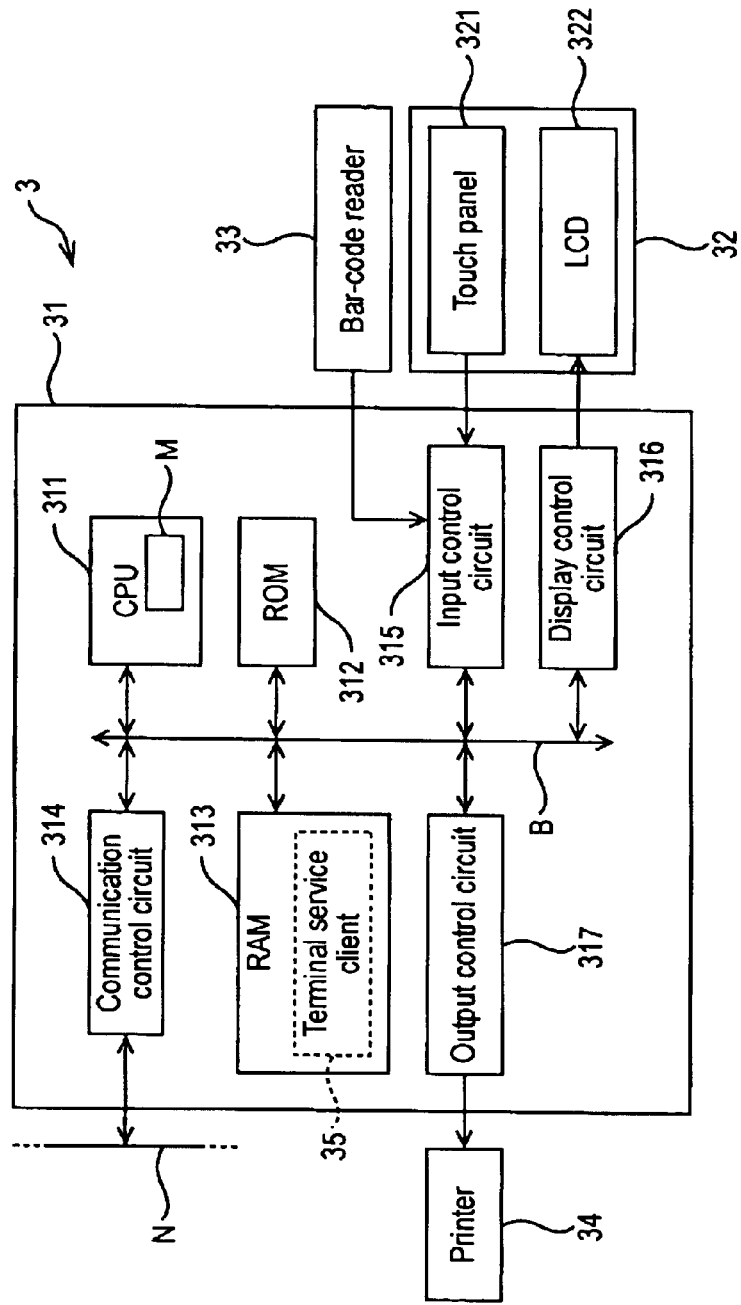
FIG. 2 is a block diagram showing a construction of each terminal in the livestock product control system show in FIG. 1.

FIG. 2 is a block diagram showing construction of each terminal 3. The terminal 3 has a main unit 31 and a display/input device 32, a bar-code leader 33 and a printer 34 that are connected to the main unit 31 as shown in FIG. 2. The main unit 31 consists of a CPU (Central Processing Unit) 311, a ROM (Read Only Memory) 312, a RAM (Random Access Memory) 313, a communication control circuit 314, an input control circuit 315, a display control circuit 316 and an output control circuit 317. These circuits are connected mutually through a bus B. The display/input device 32 is provided with a touch panel 321 and an LCD (Liquid Crystal Display) 322.

The CPU 311 controls the terminal 3 and executes various process. The CPU 311 has a clock M built therein to obtain the current time (year, month, day, minute and second).

The ROM 312 stores various programs executed by the CPU 311 and various data. The programs stored in the ROM 312 includes an OS that controls hardware of the terminal 3 and enables communicating function, various drivers and the terminal service client 35. Further, the data stored in the ROM 312 includes the stage names (A through G) that are corresponding to the respective terminals 3.

The RAM 313 is a main memory on which the working area is developed when the CPU 311 executes process of each program. FIG. 2 shows the condition when the terminal service client 35 is developed on the RAM 313.

The display control circuit 316 is an interface to generate image data displayed on the LCD 322 based on instructions from the CPU 311.

The touch panel 321 is arranged on a screen of the LCD 322, inputting a signal representing a position touched by an operator to the input control circuit 315. The bar-code reader 33 inputs image signals to the input control circuit 315. The input control circuit 315 is an interface that converts the input signal into binary signal and sends it to the CPU 311.

Further, the CPU 311 specifies a touched item (a button) displayed on the LCD 322 by analyzing the input signal from the touch panel 321 with a touch panel driver (not shown), interpreting that the specified button is touched. The CPU 311 also converts the image signal from the bar-code reader 33 into a numeral string with a bar-code reader driver (not shown).

The output control circuit 317 is an interface (Centronics interface, USB interface) to transmit print data output from the CPU 311 to the printer 34. The printer 34 is a general printer that can print a label. The communication control circuit 314 is an interface with the Internet N.

Figure 3:
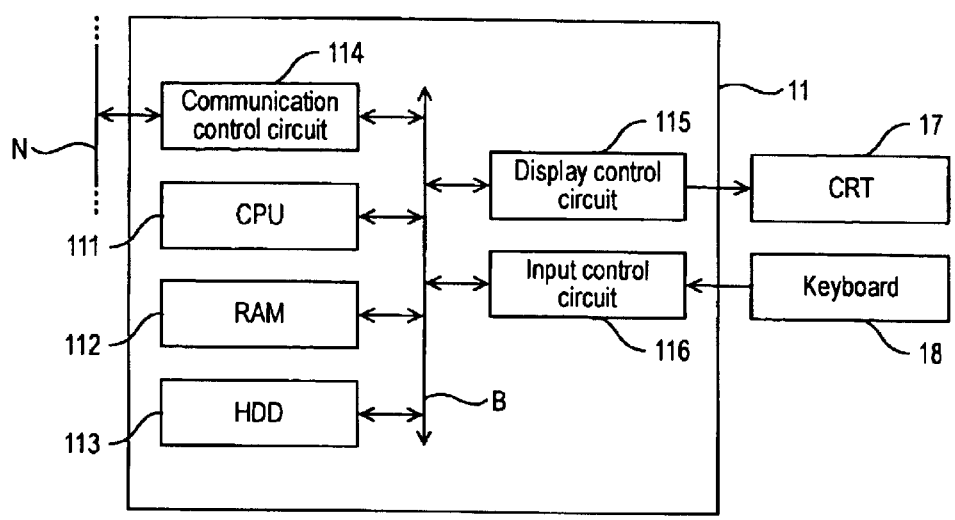
FIG. 3 is a block diagram showing a construction of a computer center in the livestock product control system shown in FIG. 1.

FIG. 3 is block diagram showing hardware constitution of the computer center 1. As shown in FIG. 3, the computer center 1 has a main unit 11, a CRT (Cathod Ray Tube) 17 and a keyboard 18 that are connected to the main unit 11. The main unit 11 has a CPU 111 as a processor, a RAM 112, a HDD (Hard Disk Drive) 113 as a storage, a communication control circuit 114, a display control circuit 115 and an input control circuit 116. These circuits are connected through a bus B. Furthermore, the CRT 17 is connected to the display control circuit 115 and the keyboard 18 is connected to the input control circuit 116.

The communication control circuit 114 is an interface with the Internet N. The HDD 113 is auxiliary memory storing various programs and data. The CPU 111 works according to each program stored in HDD 113. The RAM 112 is a main memory on which the working area is developed when the CPU 111 executes process of each program. The display control circuit 115 is an interface to generate image data displayed on the CRT 17 based on instructions from the CPU 111. The input control circuit 116 is an interface that converts the input signal from the keyboard 18 operated by an operator into code signal and sends it to the CPU 111.

Next, the operation of the livestock product control system described above will be explained.

A livestock product is registered with the process control database 25 at the stage A (breeding by a breeding supplier) and a bar-code label is attached. At the following stages B through G, a livestock product carried into a stage as "material" is identified by reading the bar-code label attached at the previous stage and a bar-code label showing a new ID number is attached to a livestock product processed at the current stage before the product is taken out from the current stage as "product".

When an operator touches the touch panel 321 of the terminal 3, the input control circuit 315 transmits the input signal corresponding to the touched position to the terminal service client 35. The terminal service client 35 sends the input signal to the terminal server 22 on the computer center 1. The terminal server 22 starts the DB registration program 23 or the DB search program 24 based on the input signal, returning the results such as image data and print data to the terminal service client 35. The terminal service client 35 makes the LCD 322 display a screen based on the received image data and makes the printer 34 print a bar code based on the received print data.

Figure 6:
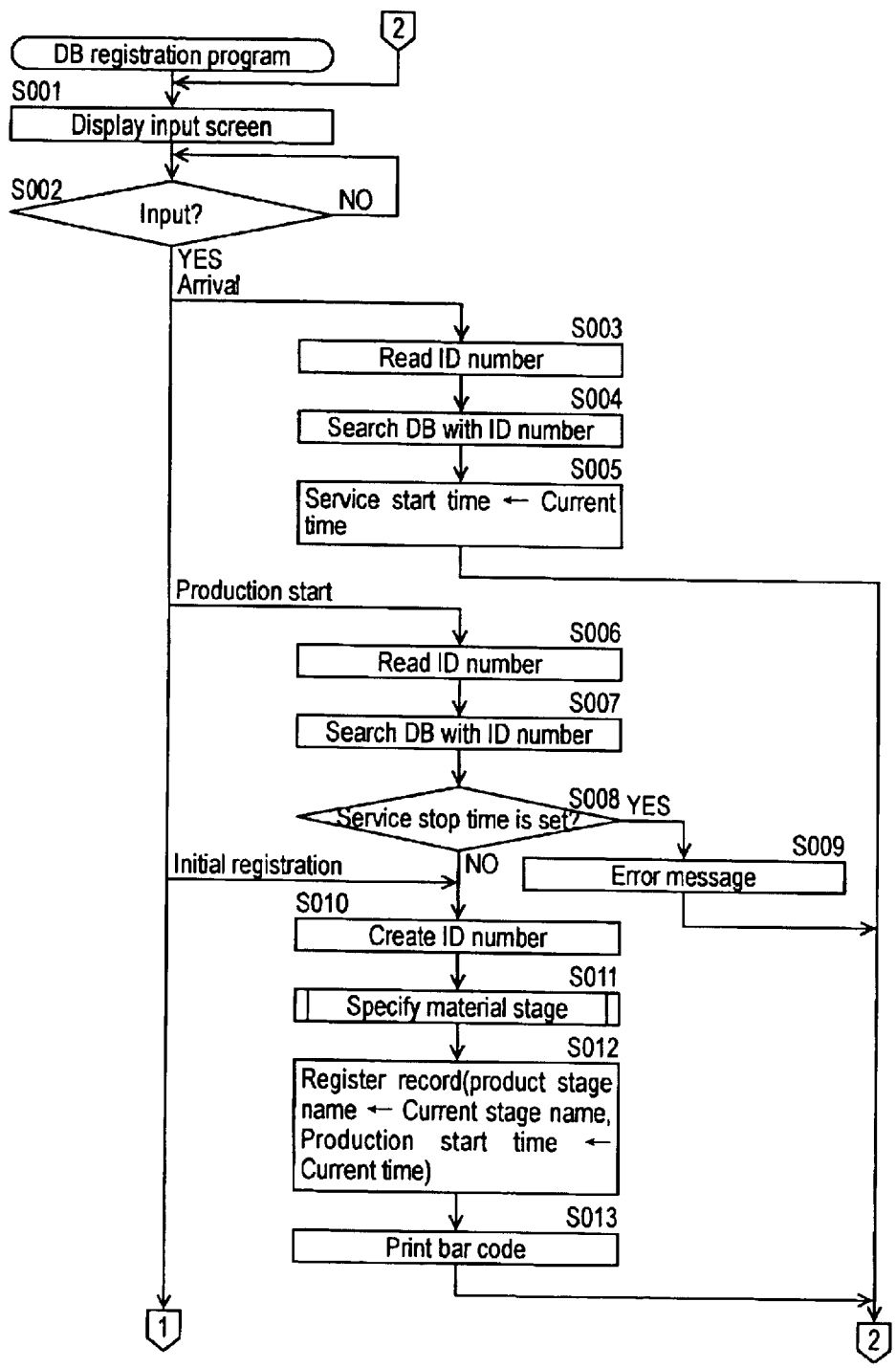
FIG. 6 and FIG. 7 are flowcharts showing a database registration program stored in the computer center shown in FIG. 1.
Figure 7:
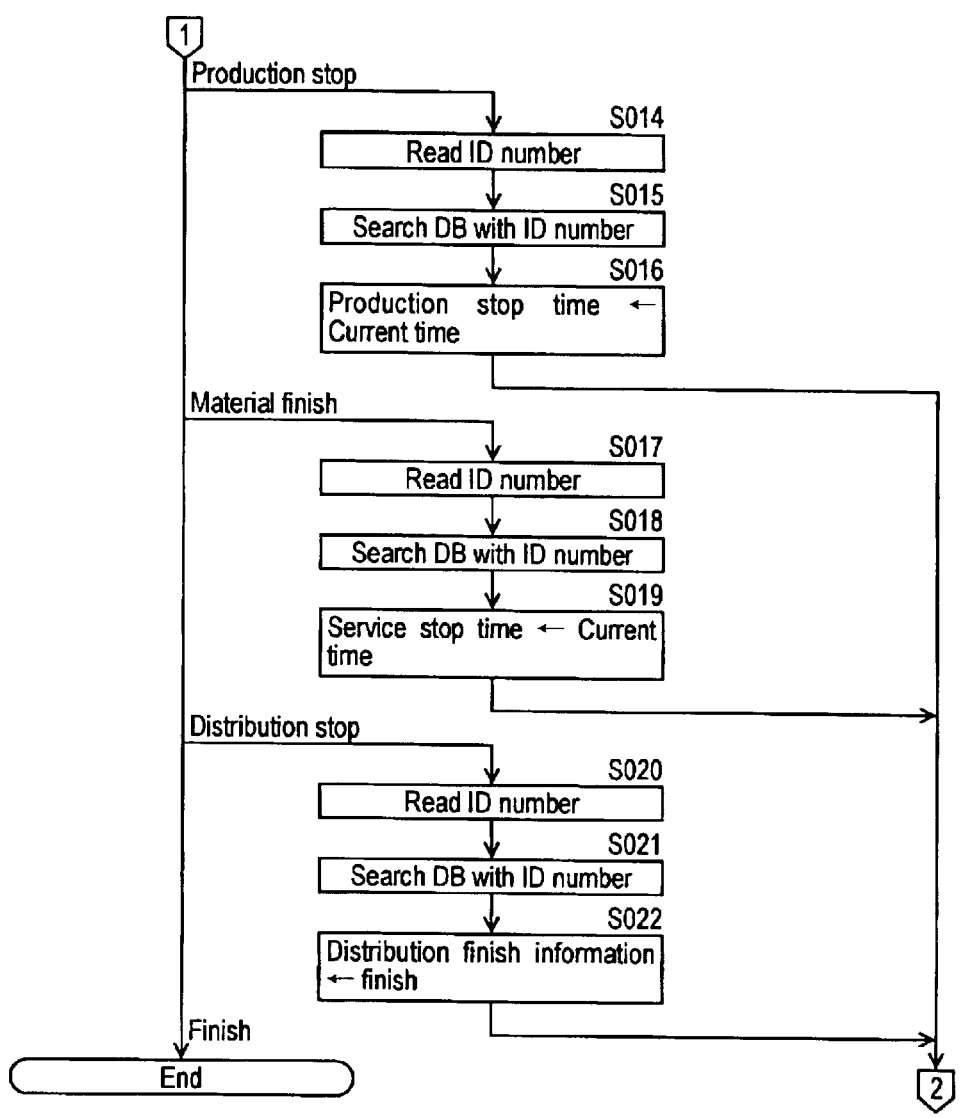

Next, the DB registration program 23 to register data with the process control database 25 of FIG. 4 will be described with reference to flowcharts shown in FIG. 6 and FIG. 7. The DB registration program 23 is started for every terminal 3 that transmits a start command.

Figure 12:
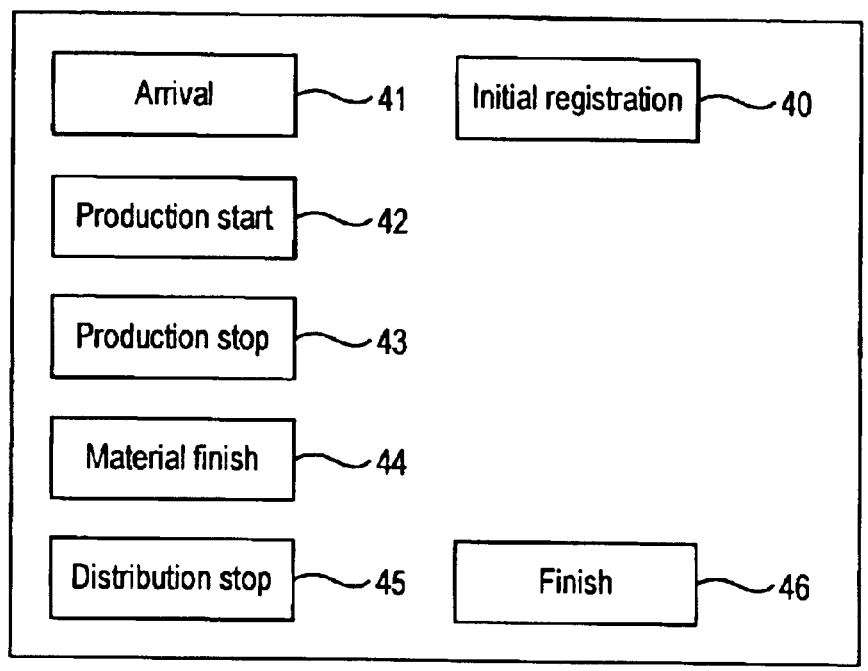
FIG. 12 shows an input screen.

At S001, the DB registration program 23 makes the LCD 322 of the terminal 3 that transmits the start command display an input screen. As shown in FIG. 12, an "Initial registration" button 40, an "Arrival" button 41, a "Production start" button 42, a "Production stop" button 43, a "Material finish" button 44, a "Distribution stop" button 45 and a "Finish" button 46 are indicated in the input screen.

At S002, the DB registration program 23 waits for a touch of any one of the buttons 40 through 46 (a touch on the touch panel 321 in an area overlapped with any one button) on the input screen of the terminal 3.

When a breeding supplier begins to breed a domestic animal at the stage A, an operator touches the "Initial registration" button 40 to create a new record and touches the "Production stop" button 43 when the supplier completes the breeding and ships the domestic animal.

Further, at the stages B, C, D and F where the material is processed, an operator at each stage touches the "Arrival" button 41 when the "material" is carried in the stage, touches the "Production start" button 42 when a process of the received "material" starts, touches the "Production stop" button 43 when the process at the stage is completed, and touches the "material finish" button 44 when the received "material" vanished by using or the received "material" becomes "product" just as it is.

Further, when a plurality of "products" are produced from one "material" at a certain stage, an operator touches the "Production start" button 42 and the "Production stop" button 43 for each "product".

Furthermore, at the stages E and G where the received "material" is taken out from the distribution, an operator at each stage touches the "Arrival" button 41 when the "material" is carried in the stage, touches the "Material finish" button 44 and the "Distribution stop" button 45 when the received "material" vanished.

When an operator touched the "Initial registration" button 40, the DB registration program 23 generates a new ID number (S010), specifying a material stage at which the livestock product produced at the current stage is used as "material" (S011), adding a new record to the process control database 25 (S012), and sending the generated ID number to the terminal 3 to print the bar code (S013).

The material stage is decided based on the hierarchy distribution channel of FIG. 5. When there are plural choices, the choices are displayed on the LCD 322 to urge the operator to select one choice. The name of the stage at which the terminal 3 is arranged is registered in the "product stage name" field of the new record. Further, the name of the material stage specified at S011, the current time and the ID number generated at S010 are stored in the "material stage name" field, the "production start time" field and the "ID number" field of the new record, respectively. A label printed in S013 is attached to the product produced by the present stage.

When a process of S013 is completed, the DB registration program 23 returns the process to S001.

When an operator touched the "Arrival" button 41, the DB registration program 23 makes the LCD 322 of the terminal 3 display an instruction to urge the operator to read the bar code attached to the livestock product received as "material" (the bar code attached at the previous stage (the product stage)) with the bar-code reader 33 (S003), searching the process control database 25 with the demodulated signal (i.e., the ID number) of the bar-code signal transmitted from the terminal 3 to specify the record that includes the ID number (S004), setting the current time in the "service start time" field of the specified record (S005). When a process of S005 is completed, the DB registration program 23 returns a process to S001.

When an operator touched the "Production start" button 42, the DB registration program 23 makes the LCD 322 of the terminal 3 display an instruction to urge the operator to read the bar code attached to the livestock product received as "material" with the bar-code reader 33 (S006), searching the process control database 25 with the demodulated signal (i.e., the ID number) of the bar-code signal transmitted from the terminal 3 to specify the record that includes the ID number (S007).

The DB registration program 23 checks whether the time information is set in the "service stop time" field of the record specified at S007 or not (S008). If the time information is stored in the "service stop time" field, the DB registration program 23 makes the LCD 322 display error information to inform that the specified livestock product (material) has been spent and does not exist (S009), returning the process to S001. If the time information is not stored in the "service stop time" field, the DB registration program 23 brings the process to S010. The process from S010 to S013 is identical to the case of the initial registration. That is, a new record is created and a new ID number is given to a product produced at the current stage. When a process of S013 is completed, the DB registration program 23 returns a process to S001.

When an operator touched the "Production stop" button 43, the DB registration program 23 makes the LCD 322 of the terminal 3 display an instruction to urge the operator to read the bar code attached to the livestock product produced by the current stage as "product" (the bar code attached at the current stage) with the bar-code reader 33 (S014), searching the process control database 25 with the demodulated signal (i.e., the ID number) of the bar-code signal transmitted from the terminal 3 to specify the record that includes the ID number (S015), setting the current time in the "Production stop time" field of the specified record (S016). When a process of S016 is completed, the DB registration program 23 returns a process to S001.

When an operator touched the "material finish" button 44, the DB registration program 23 makes the LCD 322 of the terminal 3 display an instruction to urge the operator to read the bar code attached to the livestock product received as "material" (the bar code attached at the previous stage (the product stage)) with the bar-code reader 33 (S017), searching the process control database 25 with the demodulated signal (i.e., the ID number) of the bar-code signal transmitted from the terminal 3 to specify the record that includes the ID number (S018), setting the current time in the "service stop time" field of the specified record (S019). When a process of S019 is completed, the DB registration program 23 returns a process to S001.

When an operator touched the "Distribution stop" button 45, the DB registration program 23 makes the LCD 322 of the terminal 3 display an instruction to urge the operator to read the bar code attached to the livestock product received as "material" (the bar code attached at the previous stage (the product stage)) with the bar-code reader 33 (S020), searching the process control database 25 with the demodulated signal (i.e., the ID number) of the bar-code signal transmitted from the terminal 3 to specify the record that includes the ID number (S021), setting the data "finished" in the "distribution finish information" field of the specified record (S022). When a process of S022 is completed, the DB registration program 23 returns a process to S001.

When an operator touches the "Finish" button 46, the DB registration program 23 finishes all the processes.

Next, the DB search program 24 that traces all livestock products coming from the abnormal domestic animal as an original product will be described with reference to flowcharts shown in FIG. 8 through FIG. 11. The DB search program 24 is started for every terminal 3 that transmits a start command. That is, a plurality of DB search programs 24 may be executed at the same time when a plurality of terminals 3 transmit the start command.

The DB search program 24 consists of an original product search process (S101) to search the abnormal livestock product as an original product and a product tracing process (S102) to trace livestock products coming from the original product.

Figure 9:
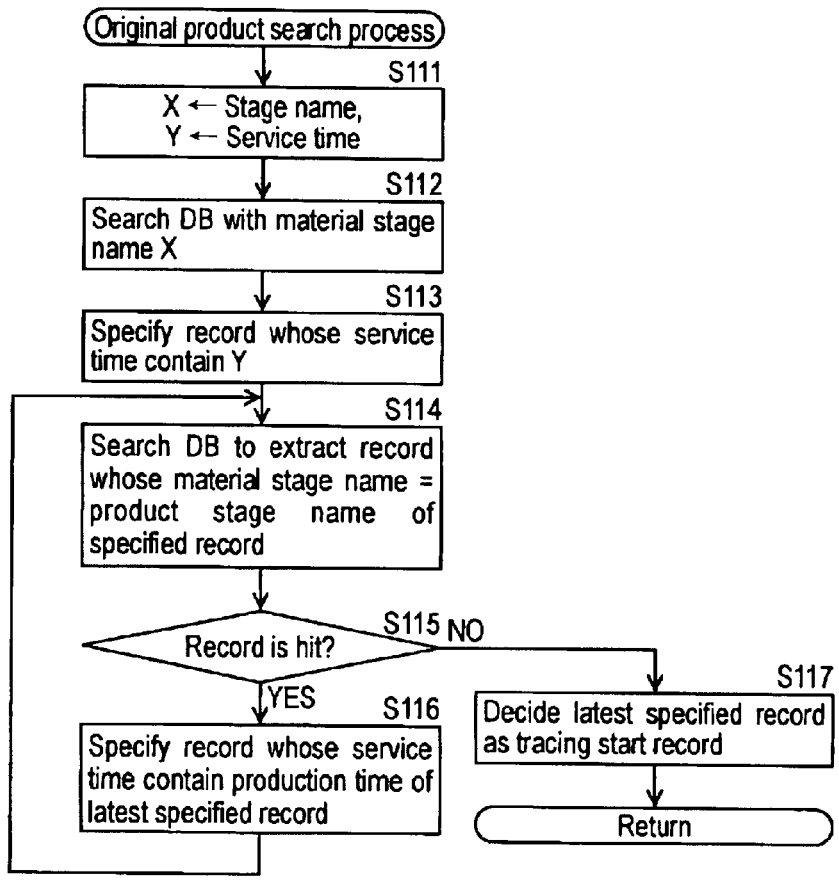
FIG. 9 is a flowchart showing an original product search process executed at S101 of FIG. 8.

FIG. 9 is a flowchart showing an original product search process (subroutine). In this subroutine, the DB search program 24 substitutes the name of the stage (the name store in the ROM 312) at which the terminal 3 that transmits the command informing the abnormality is arranged for a variable X and substitutes the time when the abnormal livestock product was used in the stage for a variable Y (S111).

Then, the DB search program 24 searches the process control database 25 to extract the record(s) whose "material stage name" is coincident with "X" (S112), specifying the record whose service time (from the "service start time" to the "service stop time") is coincident with "Y" (S113).

Next, the DB search program 24 executes a process loop from S114 to S116 to trace the distribution channel back to the original product (a domestic animal bred in a stock field). In the process loop, the DB search program 24 searches the process control database 25 to extract records whose "material stage name" is coincident with the "product stage name" (S114). Then, the DB search program 24 checks whether any record was hit at S114 or not (S115). If any record was extracted (S115, Yes), the DB search program 24 judges that the process has not yet achieved to the original product, bringing the process to S116.

At S116, the DB search program 24 specifies only one record whose service time (from the "service start time" to the "service stop time") contains the production time (from the "production start time" to the "production stop time") of the latest specified record among the records extracted at S114.

After completion of S116, the DB search program 24 returns a process to S114 and searches based on a newly specified record.

When no record was hit (S115, No) after repeat of the process loop, the DB search program 24 judges that the process was back to the top stage, bringing the process from S115 to S117.

At S117, the DB search program 24 decides that the latest specified record is the tracing start record. When the process at S117 is completed, the DB search program 24 finish this original product search process (subroutine), returning the process to the main routine of FIG. 8.

Figure 8:
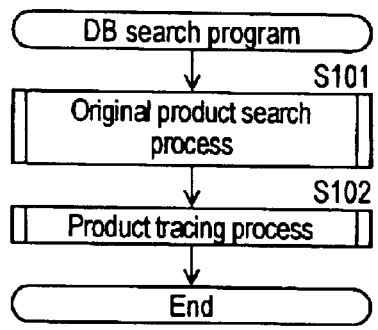
FIG. 8 is a flowchart showing a database search program stored in the computer center shown in FIG. 1.
Figure 10:
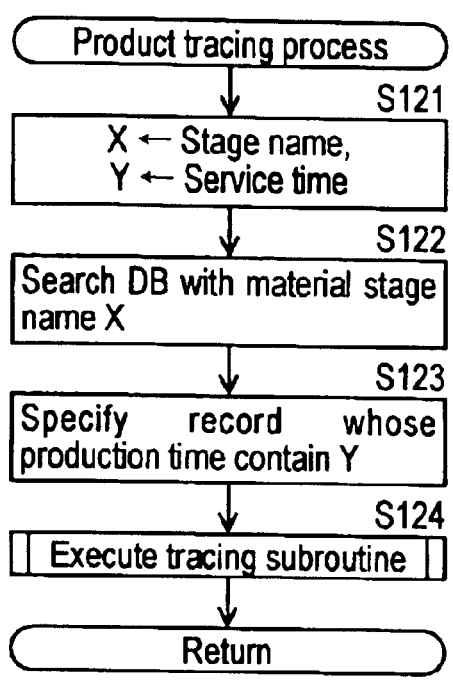
FIG. 10 is a flowchart showing a product tracing process executed at S102 of FIG. 8.

In the main routine of FIG. 8, the DB search program 24 executes a process at S102 after the process at S101. FIG. 10 is a flowchart showing a product tracing process (subroutine) executed at S102. In this subroutine, the DB search program 24 substitutes the stage name and the production time of the tracing start record for variables X and Y, respectively (S121). In other words, the program 24 specifies the stage and the time where the infected livestock product is processed.

The product tracing process may be executed as an independent process when the source of infection is known at the beginning or when the tracing starts from the stage other than the top stage, in addition to be executed as the subroutine of the DB search program 24. When the product tracing process is executed as the subroutine, the "product stage name" and the production time of the tracing start record specified by the original product search process are substituted into the variables X and Y. On the other hand, when the product tracing process is executed independently, an operator substitutes a stage name and a production time into the variables X and Y.

The DB search program 24 searches the process control database 25 to extract records whose "product stage name" is X (S122), specifying a record whose production time (from the "production start time" to the "production stop time") contains Y as a target record from the extracted records (S123). This record is unique because the product stage is the top stage A (breeding of a domestic animal). The process from S121 to S123 corresponds to the first process.

Figure 11:
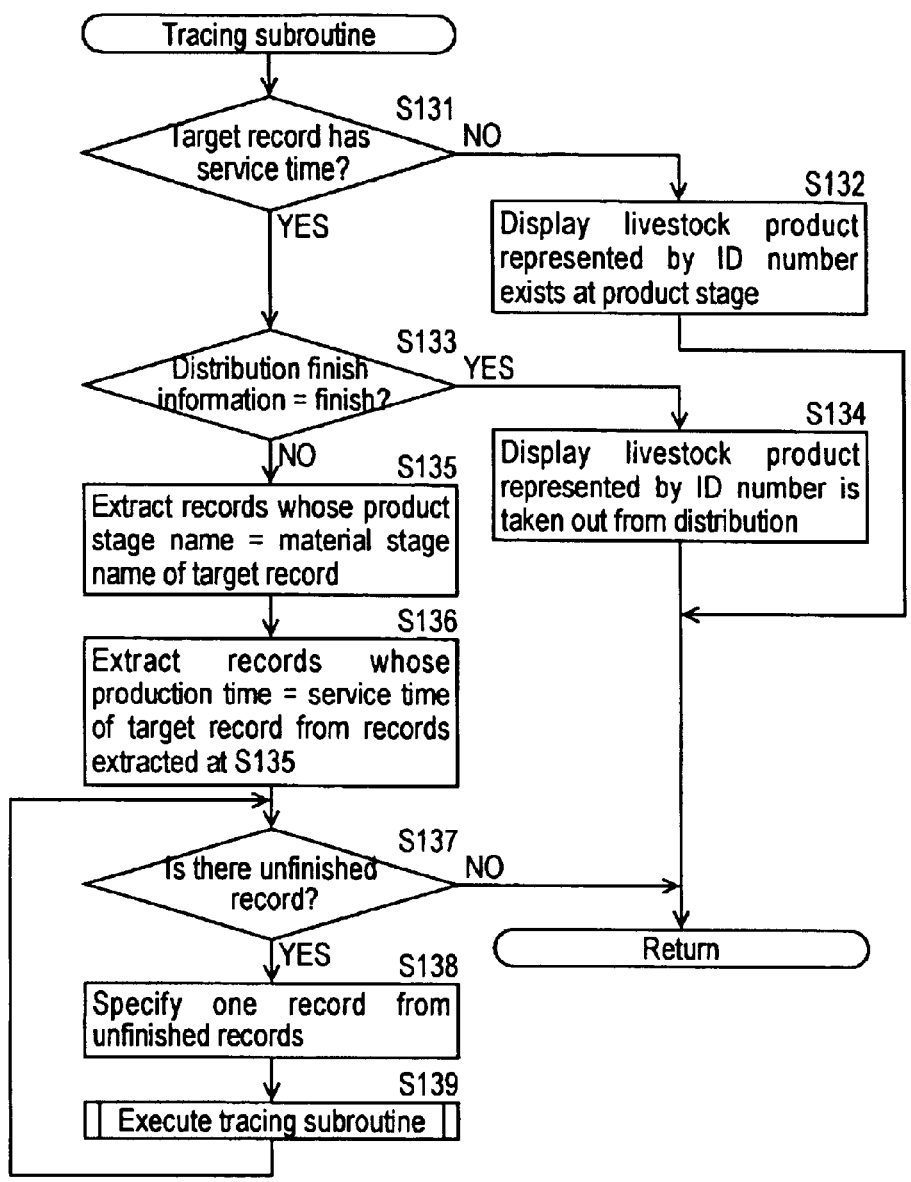
FIG. 11 is a flowchart showing a tracing subroutine executed at S124 of FIG. 10 or S139 of FIG. 11.

Next, the DB search program 24 starts a tracing subroutine, executing the process (the second process) based on the target record specified at S123 (S124). FIG. 11 is a flowchart showing this tracing subroutine. The tracing subroutines can be started simultaneously as nested loops because this tracing subroutine is a recursive subroutine having a process for starting the tracing subroutine (S139).

In each tracing subroutine started, the DB search program 24 checks whether the target record that is passed from the process that starts the tracing subroutine (S124 of the product tracing process in FIG. 10 or S139 of the tracing subroutine started as a parent process) has the service time (from the "service start time" to the "service stop time") or not (S131). When the target record does not have the service time, the DB search program 24 makes the LCD 322 of the terminal 3 display a message to inform that the livestock product represented by the ID number of the target record exists at the stage represented by the "Product stage name" (S132). When a process of S132 is completed, the DB search program 24 finishes the tracing subroutine, passing the completion of the process to the parent process as an argument.

On the other hand, when it was judged that the target record has a service time at S131, the DB search program 24 brings the process to S133. At S133, the DB search program 24 checks whether "finished" is set in the "distribution finish information" field of the target record or not. If "finished" is set, the DB search program 24 makes the LCD 322 of the terminal 3 display a message to inform that the livestock product represented by the ID number of the target record is taken out from the distribution channel at the stage represented by the "material stage name" (S134). When a process of S134 is completed, the DB search program 24 finishes the tracing subroutine, passing the completion of the process to the parent process as an argument.

On the other hand, when "finished" is not set in the "distribution finish information" field of the target record, the DB search program 24 searches the process control database 25 to extract records whose "product stage name" is coincident with the "material stage name" of the target record (S135), further extracting records whose production time (from the "production start time" to the "production stop time") is contained in the service time (from the "service start time" to the "service stop time") from the records extracted at S135 (S136). At S136, a plurality of records may be extracted. For example, when a plurality of products are produced from the livestock product (material) represented by the "ID number" at the stage of the "material stage name" in the target record, a plurality of records are extracted at S136. Therefore, the DB search program 24 executes the process loop from S137 to S139 for each product.

In this process loop, the DB search program 24 checks whether there is a record that has not been a target record of the tracing subroutine among the records extracted at S136. If there is any record that has not been a target record, the DB search program 24 specifies one record among them (S138), starting the tracing subroutine as a child process (S139). Receiving the completion of the tracing process started as a child process as an argument, the DB search program 24 brings the process back to S137.

When the tracing subroutine is executed for all the records extracted at S136 by repeating the loop process from S137 to S139 (S137, Yes), the DB search program 24 finishes the tracing subroutine, returning the completion of the process to the parent process as an argument.

As described above, all the livestock products coming from the same domestic animal that are distributed along a hierarchy distribution channel can be traced and the locations thereof can be discovered by repeating the tracing subroutine as nested loops until a new target record cannot be specified.

When the completion of the tracing subroutine started at S124 is returned as the argument, the DB search program 24 finishes the product tracing process of FIG. 10, finishing the main routine of FIG. 8.

Next, a specific process example based on the DB search program 24 will be described.

It is assumed that livestock products coming from the same domestic animal are distributed along distribution channel shown in FIG. 5, an operator at each stage inputs necessary information according to the DB registration program 23, and the records are stored in the process control database 25 as shown in FIG. 4. Further, it is assumed that abnormality (BSE positive reaction, for example) is detected from a livestock product processed (taken to a temporary safekeeping warehouse) at the time from T81 to T82 at the stage E.

In this case, all the livestock products coming from the original product of the abnormal livestock product must be traced to collect them. Therefore, an operator starts the DB search program 24 from the terminal 3 at the stage E, inputting the stage name=E and the service time=T81–T82 (S111). Then, the DB search program 24 searches the process control database 25 to specify the record whose "material stage name" is E and whose service time (from the "service start time" to the "service stop time") contains T81–T82 (S112, S113). As a result, the record whose record number=4 is specified.

Next, the DB search program 24 searches the process control database 25 to extract records whose "material stage name" is B that is identical to the "product stage name" of the record whose record number=4 (S114). In this case, since the record whose record number=1 is extracted, the judgment at S115 becomes YES. Further, the record whose record number=1 is specified (S116) because the service time (from the "service start time" to the "service stop time") of the record whose record number=1 contains the production time=T81–T82 of the record whose record number=4. Since the DB search program 24 achieves the top record, no record is extracted by the next search at S114 (S115, No), which specifies the record whose record number=1 as the tracing start record (S117). As a result of the search, the original product of the abnormal livestock product is the domestic animal whose "ID number"=SS1.

Next, the DB search program 24 substitutes the stage name A at which the domestic animal whose "ID number"= SS1 is bred and the production time T11–T12 for the variables X and Y, respectively (S121). Then, the DB search program 24 searches the process control database 25 to extract records whose "product stage name" is A (S122), specifying a record whose production time (from the "production start time" to the "production stop time") contains T11–T12 from the extracted records (S123). As a result, the record whose record number=1 is specified as a target record.

Next, the DB search program 24 starts a tracing subroutine (a first tracing subroutine) (S124), searching the process control database 25 to extract records whose "product stage name" is B that is identical to the "material stage name" of the target record whose record number=1 (S135), further extracting records whose production time (from the "production start time" to the "production stop time") is contained in the service time=T21–T22 of the record whose record number=1 (S136). As a result, the records whose record numbers are 2, 3 and 4 are extracted.

Then, second, third and fourth tracing subroutines are started for the extracted records, respectively, the livestock products coming from the infected domestic animal are traced along the hierarchy distribution channel.

In the second tracing subroutine, the record whose record number=4 becomes the target record. However, since the vale "finished" is set in the "distribution finish information" field of the target record (S133, YES), it is apparent that the livestock product (hides or the like) whose "ID number" is SS4 is taken out from the distribution at the stage E (safekeeping to the temporary safekeeping warehouse by the dismantling supplier) (S134).

In the third tracing subroutine, the record whose record number=2 becomes the target record. The DB search program 24 searches the process control database 25 to extract records whose "product stage name" is C that is identical to the "material stage name" of the target record whose record number=2 (S135), further extracting records whose production time (from the "production start time" to the "production stop time") is contained in the service time=T41–T42 of the record whose record number=2 (S136). As a result, the record whose record number=5 is specified as a new target record. Then, a fifth tracing subroutine starts for the new target record whose record number=5 to trace the livestock products coming from the infected domestic animal. In the same manner, the tracing subroutine (the second process) starts for each target record until a new target record cannot be specified, which enables to discover the location of the livestock products coming from the infected domestic animal whose "ID number"=SS1 along the distribution channel.

In the fourth tracing subroutine, the record whose record number=3 becomes the target record. The DB search program 24 searches the process control database 25 to extract records whose "product stage name" is D that is identical to the "material stage name" of the target record whose record number=3 (S135), further extracting records whose production time (from the "production start time" to the "production stop time") is contained in the service time=T61–T62 of the record whose record number=3 (S136). As a result, the record whose record number=6 is specified as a new target record. Then, a sixth tracing subroutine starts for the new target record whose record number=6 to trace the livestock products coming from the infected domestic animal.

In the sixth tracing subroutine, since the service time (from the "service start time" to the "service stop time") of the record whose record number=6 is blank (S131, NO), it is apparent that the livestock product (unnecessary portions) whose "ID number" is SS6 exists at the stage D (frozen storage to an unnecessary part warehouse by the dismantling supplier) (S134).

As described above, an inspector is able to discover the locations of the livestock products coming from the infected domestic animal whose "ID number"=SS1. That is, the livestock product (hides or the like) whose "ID number"= SS4 exists at the stage E, the livestock product (unnecessary portions) whose "ID number"=SS6 exists at the stage D and the other products exist at the stage following the stage F. Therefore, the system of the embodiment discovers the locations of the livestock products with high possibility of infection coming from the infected domestic animal.

According to the livestock product tracing system of the present invention, an inspector can easily trace all livestock products coming from an original product in any stage along a distribution channel by himself/herself without reports from suppliers.

Further, information about feed, a breeding method and/or a transportation method may be added to the record of the process control database for detail information.

The present disclosure relates to the subject matter contained in Japanese Patent Application No. P2002-186430, filed on Jun. 26, 2002, which is expressly incorporated herein by reference in its entirety.

What is claimed is:

1. A food product tracing system that traces food products coming from an original product and distributed along a distribution channel that has a plurality of stages at which material is processed to form a product, said system comprising:

a storage that includes records created for every food product at every stage of processing, said records include first stage information for identifying the first stage at which the food product is processed, first time information that specifies a time period of processing at said first stage, second stage information for identifying the second stage at which the food product processed at said first stage is received as material and second time information that specifies the time period of processing at said second stage; and a processor that operates according to programs having a first process and a second process, said first process specifying a target record whose first stage information and first time information are coincident with the stage and the time at which said original product is processed, said second process specifying a new target record whose first stage information and first time information are coincident with the second stage information and the second time information of a previous target record, wherein said second process is repeated until a new target record cannot be specified.

2. The food product tracing system according to claim 1, wherein a definition of said original product includes a domestic animal and the definition of said processing includes a breeding of the domestic animal.

3. The food product tracing system according to claim 1, wherein each of said first time information and said second time information comprise a start time and an end time of the time period.

4. The food product tracing system according to claim 1, wherein said processor executes said second process for each target record when a plurality of target records are specified by the previous second process.

5. The food product tracing system according to claim 1, wherein said processor outputs contents of a latest target record when said second process cannot specify a new target record.

6. The food product tracing system according to claim 5, wherein said second process cannot specify a new target record when the previous target record does not include said second time information.

7. The food product tracing system according to claim 5, wherein said processor executes said first and second processes based on information transmitted from a terminal through a network and sends the contents of the latest target record to said terminal through said network.

8. The food product tracing system according to claim 7, wherein said processor starts said first process for every terminal that transmits a start command.

9. The food product tracing system according to claim 7, wherein said processor makes the terminal display a message to indicate that the food product represented by said latest target record exists at the stage represented by said first stage information of said latest target record.

10. The food product tracing system according to claim 7, wherein said processor makes the terminal display a message to indicate that the food product represented by the latest target record is taken out from the distribution channel at the stage represented by the second stage information of the latest target record.

11. A food product tracing program that traces food products coming from an original product and distributed along a distribution channel that has a plurality of stages at which material is processed to form a product, said program running on a computer that can access a storage that includes records created for every food product at every stage, said records including first stage information for identifying the first stage at which the food product is processed, first time information that specifies a time period of processing at said first stage, second stage information for identifying the second stage at which the food product processed at said first stage is received as material and second time information that specifies a time period of processing at said second stage, said program comprising:

a first process that specifies a target record whose first stage information and first time information are coincident with the stage and the time at which said original product is processed, and a second process that specifies a new target record whose first stage information and first time information are coincident with the second stage information and the second time information of the previous target record, wherein said second process is repeated until a new target record cannot be specified.

12. A food product tracing method that traces food products coming from an original product and distributed along a distribution channel that has a plurality of stages at which material is processed to form a product, said method comprising:

storing records created for every food product at every stage, said records include first stage information for identifying the first stage at which the food product is processed, first time information for specifying a time period of processing at said first stage, second stage information for identifying the second stage at which the food product processed at said first stage is received as material and second time information for specifying the time period of processing at said second stage;

executing a first process, said first process specifying a target record whose first stage information and first time information are coincident with the stage and the time at which said original product is processed; and executing a second process, said second process specifying a new target record whose first stage information and first time information are coincident with the second stage information and the second time information of the previous target record, wherein said second process is repeated until a new target record cannot be specified.

* * * * *